(12) United States Patent
Durham

(10) Patent No.: US 10,068,101 B2
(45) Date of Patent: Sep. 4, 2018

(54) SECURE CONTENT SHARING

(71) Applicant: Intel Corporation, Santa Clara, CA (US)

(72) Inventor: Lenitra M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 14/368,345

(22) PCT Filed: Dec. 23, 2013

(86) PCT No.: PCT/US2013/077585
§ 371 (c)(1),
(2) Date: Jun. 24, 2014

(87) PCT Pub. No.: WO2015/099678
PCT Pub. Date: Jul. 2, 2015

(65) Prior Publication Data
US 2016/0300070 A1    Oct. 13, 2016

(51) Int. Cl.
*G06F 21/62* (2013.01)
*G06F 21/10* (2013.01)
*H04L 29/06* (2006.01)

(52) U.S. Cl.
CPC .......... *G06F 21/6209* (2013.01); *G06F 21/10* (2013.01); *H04L 63/0428* (2013.01); *H04L 63/06* (2013.01); *H04L 63/20* (2013.01); *G06F 2221/2111* (2013.01)

(58) Field of Classification Search
CPC .......... G06F 21/10; G06F 15/16; G06F 21/57; G06F 21/6209; G06F 21/62; H04L 63/107; H04L 63/12; H04L 63/0492
See application file for complete search history.

(56) References Cited

U.S. PATENT DOCUMENTS

| 7,024,552 B1 | 4/2006 | Caswell et al. |
| 2003/0194093 A1 | 10/2003 | Evans et al. |
| 2004/0193902 A1* | 9/2004 | Vogler .................... G06F 21/10 713/193 |

(Continued)

FOREIGN PATENT DOCUMENTS

KR    10-2005-0006159 A    1/2005

OTHER PUBLICATIONS

Liu et al., Digital Rights Management for Content Distribution, 2003.*

(Continued)

*Primary Examiner* — Hadi S Armouche
*Assistant Examiner* — Huan V Doan
(74) *Attorney, Agent, or Firm* — Barnes & Thornburg, LLP

(57) ABSTRACT

Technologies for sharing secure content include a source computing device to determine a content use policy for content of the source computing device. The content use policy defines at least one location at which a destination computing device is permitted to access the content. The source computing device encrypts the content with an encryption key to generate encrypted content, generates a secure content package, and transmits the secure content package to the destination computing device. The secure content package includes the encrypted content and the content use policy.

21 Claims, 10 Drawing Sheets

(56) References Cited

U.S. PATENT DOCUMENTS

| | | | | |
|---|---|---|---|---|
| 2005/0124319 A1* | 6/2005 | Williams | ............ | H04L 63/0492 455/411 |
| 2005/0192902 A1* | 9/2005 | Williams | ................ | G06F 21/10 705/51 |
| 2009/0235347 A1 | 9/2009 | Syed et al. | | |
| 2011/0083101 A1* | 4/2011 | Sharon | ................ | G06F 21/6245 715/800 |
| 2011/0154382 A1* | 6/2011 | Chow | .............. | H04N 21/25841 725/5 |
| 2012/0089699 A1* | 4/2012 | Cholas | ................ | H04L 12/2812 709/217 |
| 2013/0143651 A1* | 6/2013 | Harrison | ............... | H04L 63/107 463/31 |
| 2013/0219458 A1* | 8/2013 | Ramanathan | ........... | G06F 21/10 726/1 |
| 2014/0122342 A1* | 5/2014 | Rajakarunanayake | ...................... | H04L 63/0823 705/59 |

OTHER PUBLICATIONS

Gueye et al., Constraint-Based Geolocation of Internet Hosts, IEEE, 14 pages (Year: 2006).*
Durr et al., Secure, Privacy-Preserving, and Context-Restricted Information Sharing for Location-based Social Networks, 6 pages Year: 2011).*
International Search Report and Written Opinion for Application No. PCT/US2013/077585, dated Sep. 24, 2014, 9 pages.

* cited by examiner under 35 USC § 371(b) of International Application No. PCT/US2013/077585, which was filed Dec. 23, 2013.

SECURE CONTENT SHARING

CROSS REFERENCE TO RELATED APPLICATIONS

This application is a national stage entry under 35 USC § 371(b) of International Application No. PCT/US2013/077585, which was filed Dec. 23, 2013.

BACKGROUND

Mobile computing devices such as smartphones, tablet computers, and laptop computers have facilitated the rapid increase in content generation and sharing between consumers. In fact, many individuals visit social network websites or applications on a daily basis to share their own content (e.g., vacation pictures or "selfies") or browse content distributed by their friends. Content is also shared between parties for business purposes and for a multitude of other reasons. As such, the content generated by mobile computing devices and/or shared among users may include personal data, proprietary data, or otherwise confidential or private data.

A wide array of technologies and mechanisms exist to secure and maintain the privacy of data. For example, data may be encrypted and stored in secure memory when not in use by one's own computing device. However, maintaining the security of data once it has been shared with another presents additional challenges due to a general loss of control over the data. For example, encrypted data may be transmitted to another computing device that has access to the cryptographic decryption key necessary to decrypt the data. Although the communication channel may be secure, once the data is decrypted by the receiving computing device, control over the data by the sending computing device is typically lost and the data may be, for example, modified, shared, or otherwise treated as unimportant data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
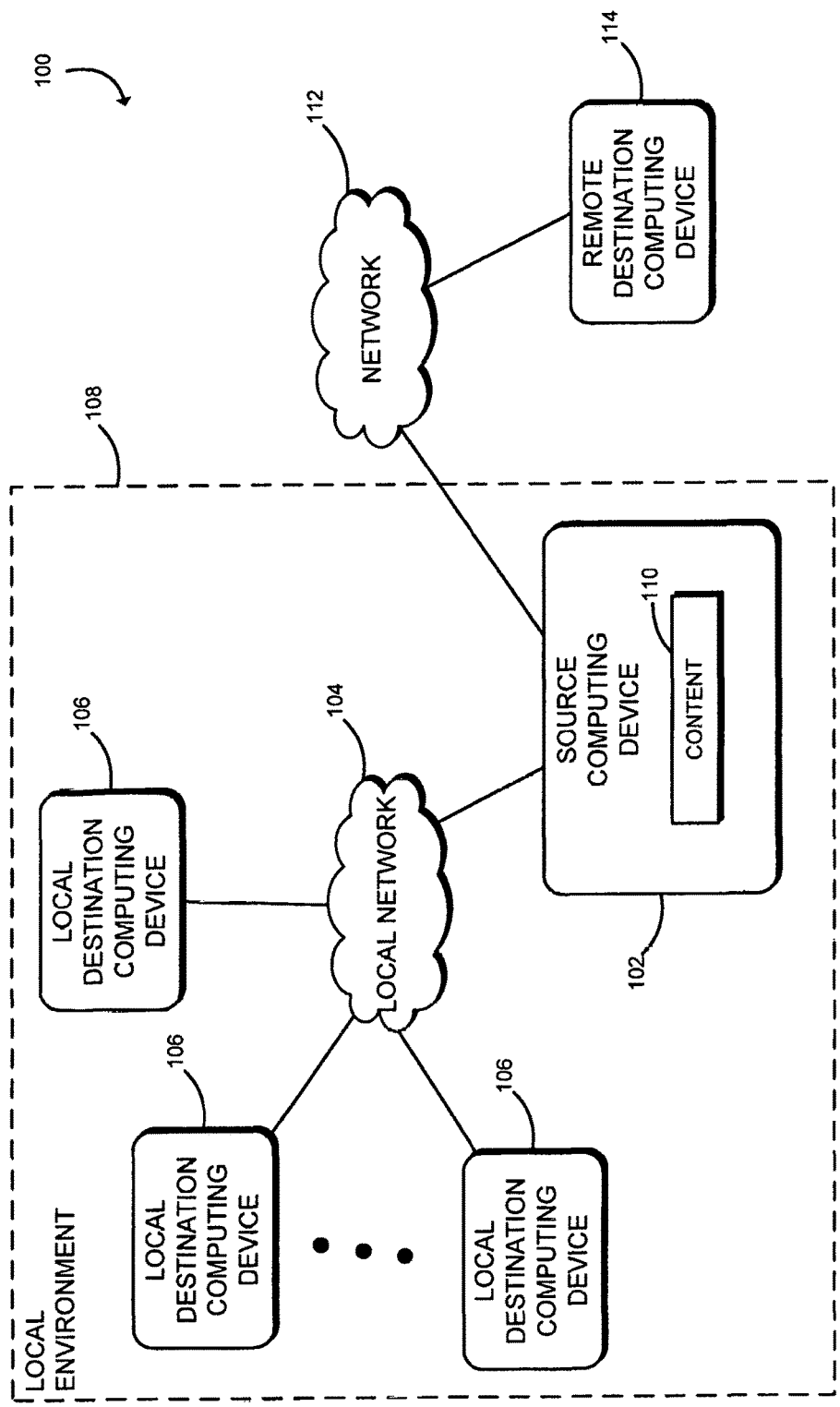
FIG. 1 is a simplified block diagram of at least one embodiment of a system for securely sharing content between computing devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for sharing content 110 between computing devices includes a source computing device 102, a local network 104, one or more local destination computing devices 106, a network 112, and a remote destination computing device 114. Although only one source computing device 102, local network 104, network 112, and remote destination computing device 114 are shown in FIG. 1, it should be appreciated that the system 100 may include multiple source computing devices 102, multiple local networks 104, multiple networks 112, and/or multiple remote destination computing devices 114 in other embodiments. Similarly, although the illustrative embodiment of FIG. 1 shows three local destination computing devices 106, the system 100 may include a different number of local destination computing devices 106 in other embodiments. It should further be appreciated that, in some embodiments, the system 100 may include one or more other computing devices (e.g., a cryptographic key management server) configured to communicate with the source computing device 102, the local destination computing devices 106, and/or the remote destination computing device 114.

The source computing device 102, the local network 104, and the local destination computing devices 106 may be situated in a local environment 108 (e.g., in the vicinity of the source computing device 102), and the remote destination computing device 114 may be outside the local environment 108. In use, as described in more detail below, the source computing device 102 is configured to securely distribute content to one or more of the destination computing devices 106, 114. In the illustrative embodiment, the source computing device 102 encrypts the content 110, determines a content use policy associated with the content 110, and generates a secure content package to be transmitted to the destination computing device 106, 114 for enforcement of the content use policy by the destination computing device 106, 114. In this way, the source computing device 102 is able to maintain control over the security of the content 110 after sharing the content 110 with the destination computing device 106, 114. As discussed below, the source computing device 102 may share the content 110 with a local destination computing device 106 within the proximity of the source computing device 102 or a remote destination computing device 114 in a location for which the content use policy authorizes access to the content 110. In another embodiment, the source computing device 102 may share the content 110 with a server or other intermediary device (e.g., in a cloud environment) for subsequent transmittal to a destination computing device 106, 114.

Each of the source computing device 102, the local destination computing devices 106, and the remote destination computing device 114 may be embodied as any type of computing device capable of performing the functions described herein. For example, each of the computing devices 102, 106, 114 may be embodied as a server, desktop computer, laptop computer, tablet computer, notebook, netbook, Ultrabook™, cellular phone, smartphone, wearable computing device, personal digital assistant, mobile Internet device, Hybrid device, and/or any other computing/communication device. It should be appreciated that, in some embodiments, the source computing device 102, the local destination computing devices 106, and the remote destination computing device 114 may include similar features and/or components.

As discussed above, the source computing device 102 may communicate with the local destination computing devices 106 over a local network 104 and/or with the remote destination computing device 114 over a network 112. It should be appreciated that the local network 104 and the network 112 may be embodied as any number of various wired and/or wireless telecommunication networks. As such, the networks 104, 112 may include one or more networks, routers, switches, computers, and/or other intervening devices. For example, the networks 104, 112 may be embodied as or otherwise include one or more cellular networks, telephone networks, local or wide area networks, publicly available global networks (e.g., the Internet), or any combination thereof.

Figure 2:
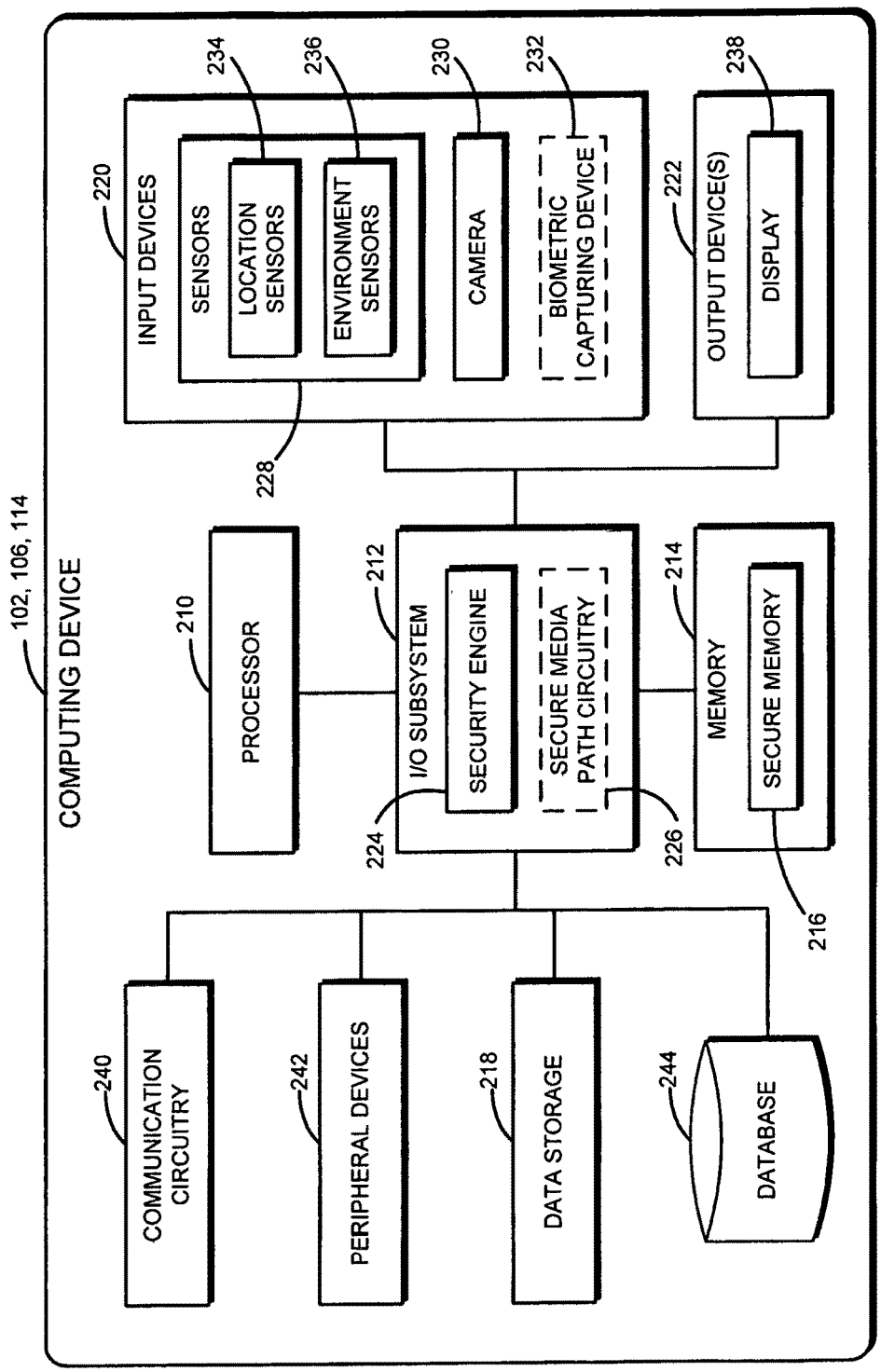
FIG. 2 is a simplified illustration of at least one embodiment of a computing device of the system of FIG. 1.

Referring now to FIG. 2, each of the illustrative computing devices 102, 106, 114 includes a processor 210, an input/output ("I/O") subsystem 212, a memory 214, a data storage 218, one or more input devices 220, and one or more output devices 222. The I/O subsystem 212 of the computing device 102, 106, 114 includes a security engine 224 and may include a secure media path circuitry 226. In the illustrative embodiment, the input devices 220 include one or more sensors 228 (e.g., location sensors 234 and/or environment sensors 236), a camera 230, and may also include a biometric capturing device 232; and the output devices 222 include a display 238. The computing device 102, 106, 114 further includes a communication circuitry 240 and one or more peripheral devices 242. Of course, any one or more of the computing device 102, 106, 114 may include other or additional components, such as those commonly found in a typical computing device (e.g., various input/output devices and/or other components) in other embodiments. Additionally, in some embodiments, one or more of the illustrative components may be incorporated in, or otherwise from a portion of, another component. For example, the memory 214, or portions thereof, may be incorporated in the processor 210 in some embodiments.

The processor 210 may be embodied as any type of processor capable of performing the functions described herein. For example, the processor may be embodied as a single on multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the computing device 102, 106, 114 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of computing device 102, 106, 114. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the computing device 102, 106, 114, on a single integrated circuit chip. As shown in the illustrative embodiment, the memory 214 may include a secure memory 216 to store, for example, cryptographic keys, biometric data, the decrypted content, the secure content package, authentication data, and/or other secure data. In some embodiments, the secure memory 216 may be embodied as a memory device separate from the main memory 214.

As indicated above, in some embodiments, the I/O subsystem 212 includes a security engine 224 and a secure media path circuitry 226. The security engine 224 may be embodied as any combination of hardware, firmware, and/or software component(s) capable of establishing a secure environment 310 (see FIG. 3). For example, the security engine 224 may be embodied as a Trusted Platform Module (TPM), a management engine (ME), or an out-of-band processor. The secure media path circuitry 226 may be used in conjunction with the secure memory 216 to provide hardware reinforced security between applications and hardware. In one embodiment, Protected Audio Video Path (PAVP) technology may be employed to implement such hardware reinforced security using the secure memory 216 and the secure media path circuitry 226. Additionally, the secure media path circuitry 226 may include secure media channels capable of facilitating secure communication between the input devices 220, the output devices 222, and other components of the computing device 102, 106, 114. It should be appreciated that the computing device 102, 106, 114 may utilize any number of additional security technologies such as, for example, Secure Enclaves (SE), Trusted Execution Technology (TXT), Virtualization Technology, trusted input/output, and/or other security technologies or mechanisms.

The data storage 218 may be embodied as any type of device or devices configured for short-term or long-term storage of data such as, for example, memory devices and circuits, memory cards, hard disk drives, solid-state drives, or other data storage devices. The data storage 218 and/or the memory 214 may store various data during operation of the computing device 102, 106, 114 such as, for example, sensor data, captured images, biometric data, and/or other data useful in the operation of the computing device 102, 106, 114.

The input devices 220 may include any number of peripheral or integrated devices suitable for receiving input from a user of the computing device 102. As indicated above, the input devices 220 may include one or more sensors 228, a camera 230, and/or a biometric capturing device 232. The sensors 228 collect data regarding the environment of the computing device 102, 106, 114, the computing device 102, 106, 114 itself, and/or other data to be used in a determination of a location, proximity, and/or context of the computing device 102, 106, 114. In various embodiments, the sensors 228 may be embodied as, or otherwise include, for example, location sensors (e.g., global positioning systems), proximity sensors, inertial sensors, optical sensors, light sensors, audio sensors (e.g., microphones), temperature sensors, motion sensors, piezoelectric sensors, and/or other types of sensors. Of course, the computing device 102, 106, 114 may also include components and/or devices configured to facilitate the use of the sensors 228.

In the illustrative embodiment of FIG. 2, the sensors 228 include the location sensors 234 and the environment sensors 236. As described below, the location sensors 234 may be used to determine, for example, an absolute or relative geographical location of the computing device 102, 106, 114. The environment sensors 236 may be used to determine a surrounding environment of the computing device 102, 106, 114, which may be used, for example, to determine whether another computing device is within a particular range of the computing device 102, 106, 114. For example, as discussed below, the computing device 102, 106, 114 may use audio sensors to determine whether another computing device is in the same room as the computing device 102, 106, 114.

The camera 230 may be embodied as any peripheral or integrated device suitable for capturing images, such as a still camera, a video camera, a webcam, or other device capable of capturing images and/or video. As discussed below, a user of the source computing device 102 may use the camera 230 to capture images/video to share with a destination computing device 106, 114. The biometric capturing device 232 may be embodied as any type of peripheral or integrated biometric capturing device that is capable of generating real-time biometric data of a user of the computing device 102, 106, 114 that may be used to authenticate the user. For example, the biometric capturing device may include the camera 230, a fingerprint scanner, handprint scanner, iris scanner, retinal scanner, voice analyzer, or other device to capture any distinguishable human biometric.

The output devices 222 of the computing device 102, 106, 114 may include any number of peripheral or integrated devices suitable for rendering output to a user of the computing device 102, 106, 114 (e.g., a display 238, speaker, and/or other output device). The display 238 of the computing device 102, 106, 114 may be embodied as any one or more display screens on which information may be displayed to a viewer of the computing device 102, 106, 114. The display 238 may be embodied as, or otherwise use, any suitable display technology including, for example, a liquid crystal display (LCD), a light emitting diode (LED) display, a cathode ray tube (CRT) display, a plasma display, and/or other display technology. Although only a single display 238 is illustrated in FIG. 1, it should be appreciated that the computing device 102, 206, 114 may include multiple displays or display screens on which the same or different content may be displayed contemporaneously or sequentially with each other.

The communication circuitry 240 may be embodied as any communication circuit, device, or collection thereof, capable of enabling communications between the computing device 102, 106, 114 and other remote devices over the network 104, 112. For example, as discussed above, the source computing device 102 may communicate with the local destination computing devices 106 over the local network 104 and/or the remote destination computing device 114 over the network 112. The communication circuitry 240 may be configured to use any one or more communication technologies (e.g., wireless or wired communications) and associated protocols (e.g., Ethernet, Bluetooth®, WiFi®, WiMAX, etc.) to effect such communication.

The peripheral devices 242 may include any number of additional peripheral or interface devices, such as speakers, microphones, additional storage devices, and so forth. The particular devices included in the peripheral devices 242 may depend on, for example, the type and/or intended use of the computing device 102, 106, 114 (e.g., whether the computing device 102, 106, 114 is a desktop computer or a mobile computing device). As shown in FIG. 2, the computing device 102, 106, 114 may also include a database 244. The illustrative database 244 may be embodied as any combination of hardware, firmware, and/or software suitable for performing the functions described herein. For example, in some embodiments, the database 244 may be embodied as a data structure stored on the computing device 102, 106, 114 suitable for recording the content 110, encrypted content, decrypted content, cryptographic keys, biometric data, the secure content package, authentication data, and/or other data. Further, in some embodiments, the database 244 may be stored on, or otherwise form a portion of, the memory 214 or the data storage 218.

Figure 3:
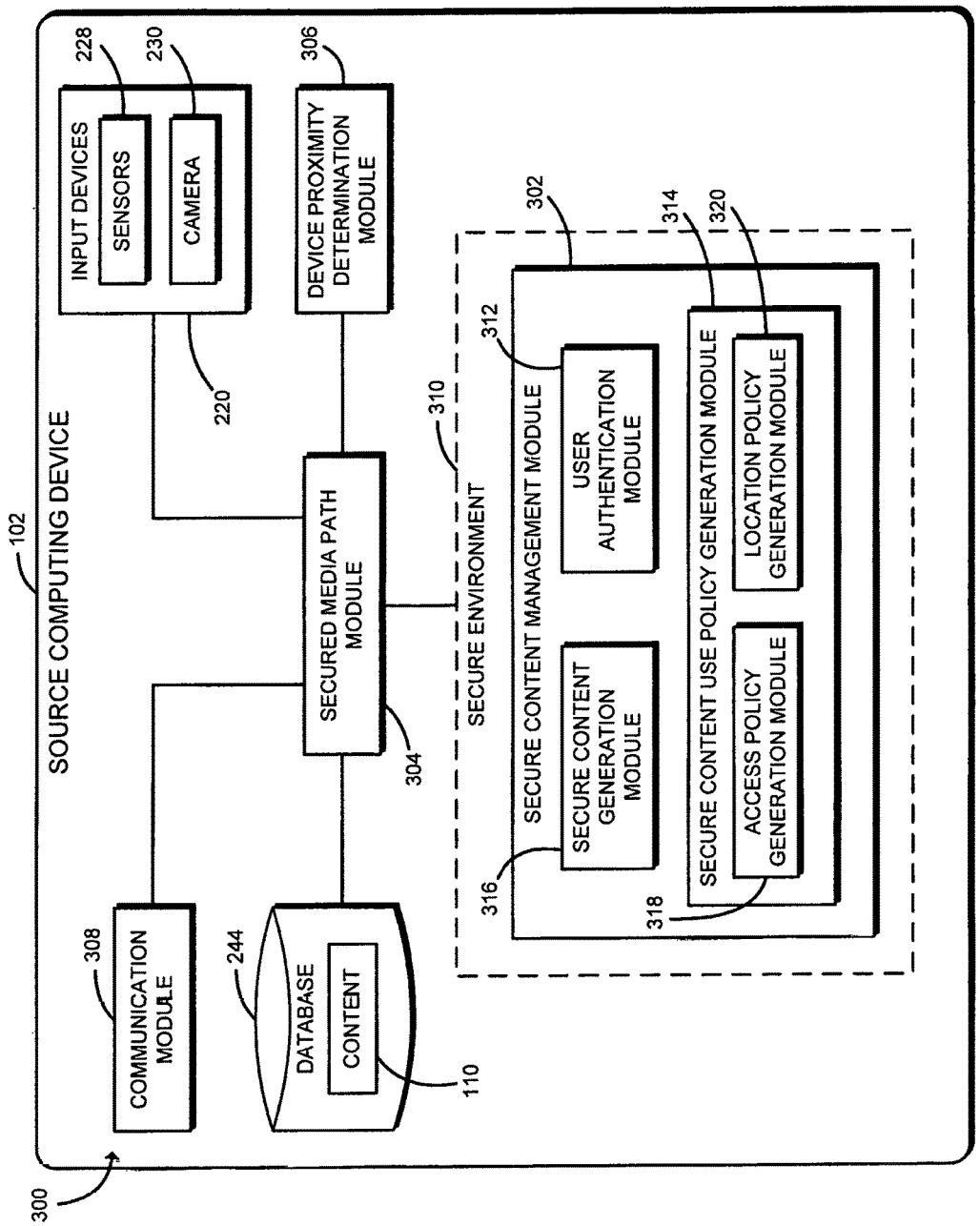
FIG. 3 is a simplified block diagram of at least one embodiment of an environment of a source computing device of the system of FIG. 1.

Referring now to FIG. 3, in use, the illustrative source computing device 102 establishes an environment 300 for sharing content 110 with one or more destination computing devices 106, 114. As discussed below, the source computing device 102 securely handles content 110 and packages the content 110 for secure consumption by destination computing devices 106, 114. In doing so, the source computing device 102 is able to maintain control over the security of the content 110 after transmitting the content 110 to the destination computing device 106, 114. The illustrative environment 300 of the source computing device 102 includes a secure content management module 302, a secured media path module 304, a device proximity determination module 306, and a communication module 308. In some embodiments, the secure content management module 302 may be executed, or embodied within, a secure environment 310. The secure content management module 302 further includes a user authentication module 312, a secure content use policy generation module 314, and a secure content generation module 316. Additionally, the secure content use policy generation module 314 includes an access policy generation module 318 and a location policy generation module 320. Each of the modules of the environment 300 may be embodied as hardware, software, firmware, or a combination thereof. Additionally, in some embodiments, one or more of the illustrative modules may form a portion of another module (e.g., the device proximity determination module 306 may form a portion of the secure content management module 302).

The secure content management module 302 ensures that the content 110 retrieved from the database 244 or from the camera 230 in real-time is packaged in a secure content package prior to transmission to a destination computing device 106, 114. As indicated above, the secure content management module 302 includes the user authentication module 312, the secure content generation module 316, and the secure content use policy generation module 314. It should be appreciated that the secure content management module 302 may be executed within, or otherwise form a portion of, the security engine 224 in some embodiments.

The user authentication module 312 determines whether the current user of the source computing device 102 is authorized to perform one or more functions of the source computing device 102. For example, in some embodiments, the user authentication module 312 may analyze biometric data of the user and/or other login information to determine whether the user is permitted to access and/or share certain content 110 stored on the source computing device 102 (e.g., for multi-user systems).

The secure content use policy generation module 314 determines a content use policy for content 110 of the source computing device 102. As described in detail below, the content use policy may include access permissions, location restrictions, proximity requirements, and/or other circumstances related to, for example, a time and place at which a destination computing device 106, 114 is permitted to access the content 110. Depending on the particular embodiment, the content use policy may be predetermined or established by the user in real time (e.g., by selecting computing devices with which to share the content 110). In the illustrative embodiment, the content use policy includes an access policy and a location policy.

The access policy generation module 318 establishes access permissions for the content 110 that identify authorized uses of the content 110 by destination computing device 106, 114. In some embodiments, the access policy generation module 318 identifies which destination computing devices 106, 114 are able to read, write, modify, transmit, or otherwise effect the content 110. For example, the access policy generation module 318 may indicate that a first destination computing device 106, 114 is permitted to read the content 110 but not modify the content 110 but that a second destination computing device 106, 114 is permitted to both access and modify the content 110. It should be appreciated that the number and type of access parameters included in the content use policy may vary depending on the particular embodiment.

The location policy generation module 320 establishes locations at which the destination computing devices 106, 114 are permitted to access the content 110. As discussed in detail below, the location policy generation module 320 may establish a geographical location at which the destination computing devices 106, 114 are permitted to access the content 110 and a proximity (e.g., from the geographical location or the source computing device 102) within which the destination computing devices 106, 114 are permitted to access the content 110. Depending on the particular embodiment, the proximity may be defined as a physical distance, an audio proximity, and/or a social network proximity as described below. For example, the location policy generation module 320 may require that the destination computing devices 106, 114 be within a physical distance of a specified geographical location, be able to sense a similar audio environment as the source computing device 102, and/or be "checked in" to the same location as the source computing device 102 on a social network application.

The secure content generation module 316 is configured to encrypt the content 110 with a content encryption key to generate encrypted content and generate a secure content package for transmission. In the illustrative embodiment, the secure content package includes the encrypted content and the content use policy established by the secure content use policy generation module 314. In some embodiments, the secure content package may also include an encrypted content decryption key (i.e., an encrypted version of the decryption key corresponding with the encryption key used to encrypt the content 110). For example, in some embodiments, the content decryption key may itself be encrypted with an asymmetric cryptographic key corresponding with a decryption key of the destination computing device(s) 106, 114 (e.g., a hardware key). For example, the content decryption key may be encrypted with an Enhanced Privacy Identification (EPID) key, another one-to-many cryptographic key, and/or a key associated with hardware of the computing devices 102, 106, 114 in some embodiments.

In other embodiments, the content decryption key may not be included in the secure content package. For example, in one embodiment, the content 110 may instead be directly encrypted with an encryption key accessible to the destination computing device(s) 106, 114 (e.g., an EPID key, a public cryptographic key associated with a private hardware key of the destination computing device(s) 106, 114, a one-to-many cryptographic key, an asymmetric cryptographic key of a public-private key pair for which the destination computing device(s) 106, 114 have the corresponding key of the key pair, or another cryptographic key). In another embodiment, the content encryption key may be retrieved by the source computing device 102 from a key management server prior to encrypting the content 110. As such, the destination computing device 106, 114 may verify its identity and/or the identity of its user to the key management server to retrieve the corresponding content decryption key from the key management server for decryption of the encrypted content. It should be appreciated that the secure content package may also be encrypted prior to transmission to a destination computing device 106, 114. For example, the secure content package may be encrypted with one or more of the cryptographic keys discussed above. Of course, in other embodiments, the secure content package may be unencrypted but may, for example, be accessible only by the security engine 224 or other secure portion of the computing device 102. Further, in one embodiment, the secure content package may include, or may be embodied as, an Intel® Data Use Control object.

As indicated above, the source computing device 102 may include secure media path circuitry 226 to enable secure input/output and handling of data. In such embodiments, the secured media path module 304 may be implemented to facilitate the secure transmission of data through the secure media path circuitry 226.

The device proximity determination module 306 is configured to interpret data received from the input devices 220 (e.g., the sensors 228) to determine the location and/or proximity of the source computing device 102 relative to the destination computing devices 106, 114. For example, the device proximity determination module 306 may determine the geographical location of the source computing device 102 relative to a destination computing device 106, 114. It should be appreciated that the source computing device 102 and the destination computing device 106, 114 may be in close proximity to one another but not in the same room, for example. As such, in some embodiments, the device proximity determination module 306 may analyze audio data sensed by a microphone of the source computing device 102 and compare that data to data sensed by the destination computing device 106, 114 to determine whether the computing devices are in the same physical environment (e.g., within the same room). Additionally, in some embodiments, the device proximity determination module 306 is configured to determine the social network proximity of the source computing device 102 to the destination computing device 106, 114. Further, as discussed in detail below, in some embodiments, the source computing device 102 may communicate with the local destination computing devices 106 to enable the user of the source computing device 102 to select local destination computing devices 106 for which to permit access to the content 110.

The communication module 308 handles the communication between the source computing device 102 and remote devices (e.g., the destination computing devices 106, 114) through the corresponding network 104, 112. As described herein, the communication module 308 may transmit data to other computing devices (e.g., the secure content package) and may also receive data from other computing devices (e.g., data regarding an audio analysis of the environment of a local destination computing device 106 to determine audio proximity).

Figure 4:
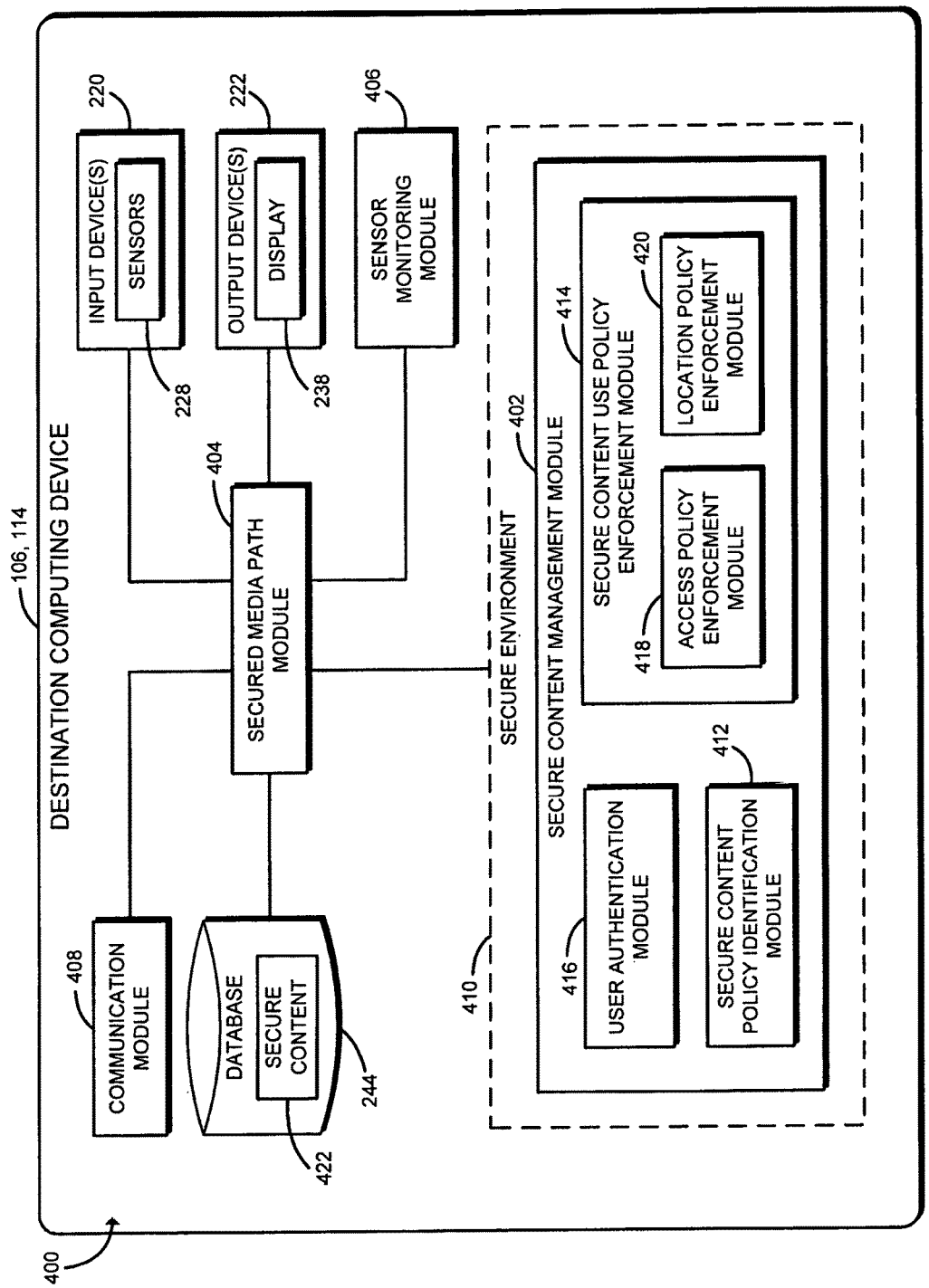
FIG. 4 is a simplified block diagram of at least one embodiment of an environment of a destination computing device of the system of FIG. 1.

Referring now to FIG. 4, in use, the illustrative destination computing device 106, 114 establishes an environment 400 for accessing content of the source computing device 102. The illustrative environment 400 of the destination computing device 106, 114 is similar to the environment 300 of the source computing device 102. Specifically, the environment 400 includes a secure content management module 402, a secured media path module 404, a sensor monitoring module 406, and a communication module 308. Similar to the secure content management module 302 of the source computing device 102, the secure content management module 402 of the destination computing device 106, 114 may be executed, or embodied within, a secure environment 410. The secure content management module 402 further includes a secure content policy identification module 412, a secure content use policy enforcement module 414, and a user authentication module 416. Additionally, the secure content use policy enforcement module 414 includes an access policy enforcement module 418 and a location policy enforcement module 420. Each of the modules of the environment 400 may be embodied as hardware, software, firmware, or a combination thereof. Additionally, in some embodiments, one or more of the illustrative modules may form a portion of another module (e.g., the sensor monitoring module 406 may form a portion of the secure content management module 402).

The secure content management module 402 ensures that secure content 422 (e.g., an encrypted version of the content 110) received from the source computing device 102 (e.g., in a secure content package) is handled in a secure manner. As described below, the secure content management module 402 determines the content use policy associated with the secure content 422 and ensures that the policy is enforced. For example, the secure content management module 402 ensures that the content 110 associated with the secure content 422 is not accessible to a user (e.g., viewable on a display 238) unless that user and/or computing device are authorized to have such access. It should be appreciated that the secure content management module 402 may be executed within, or otherwise form a portion of, the security engine 224 in some embodiments.

The secure content policy identification module 412 determines the content use policy associated with the secure content 422 and included in the secure content package. As discussed above, in some embodiments, the secure content package may be encrypted. In such embodiments, the secure content policy identification module 412 retrieves the corresponding decryption key, decrypts the secure content package, and accesses the content use policy for the encrypted content included in the secure content package. For example, as discussed above, the secure content policy identification module 412 may use a hardware cryptographic key or other cryptographic key to decrypt the secure content package in those embodiments.

The secure content use policy enforcement module 414 is configured to determine whether the destination computing device 106, 114 is compatible with the secure content package and capable of enforcing the content use policy. For example, in some embodiments, the destination computing device 106, 114 may only be able to interpret and/or enforce the content use policy if the destination computing device 106, 114 includes a particular hardware, firmware, and/or software component (e.g., the security engine 224). If the secure content use policy enforcement module 414 is compatible with the secure content package and capable of enforcing the content use policy, the secure content use policy enforcement module 414 is configured to enforce the content use policy for the secure content 422 identified by the secure content policy identification module 412. As such, the secure content use policy enforcement module 414 determines whether the destination computing device 106, 114 is permitted to access the content 110 (i.e., a decrypted version of the encrypted secure content 422) based on the content use policy. If so, the secure content use policy enforcement module 414 decrypts the encrypted content with the corresponding content decryption key. It should be appreciated that the content decryption key may be an asymmetric cryptographic key or a symmetric cryptographic key depending on the particular embodiment. Further, as described above, in some embodiments, the content decryption key for the encrypted content may itself be encrypted (e.g., in addition or alternatively to encryption of the secure content package) and included in the secure content package received from the source computing device 102. In such a case, the secure content use policy enforcement module 414 decrypts the content decryption key using a suitable cryptographic key in order to utilize that key to decrypt the encrypted content. In the embodiments described above in which the content decryption key is retrieved by the source computing device 102 from a key management server prior to encrypting the content 110, the destination computing device 106, 114 may instead retrieve the corresponding content decryption key from the key management server (e.g., after successful authentication to the key management server). Further, in embodiments in which the source computing device 102 directly encrypts the content 110 with an encryption key accessible to the destination computing device(s) 106, 114, the destination computing device(s) 106, 114 utilize that cryptographic key (e.g., a hardware key) to decrypt the content 110.

As shown, the illustrative secure content use policy enforcement module 414 includes an access policy enforcement module 418 and a location policy enforcement module 420, which are configured to enforce the corresponding access policy and location policy of the content use policy established by the source computing device 102. As discussed herein, the access policy enforcement module 418 is configured to prevent unauthorized uses of the decrypted content 110 by the destination computing device 106, 114 based on the content use policy (e.g., unauthorized reads, writes, modifications, transmissions, and/or other operations). Of course, the content use policy may permit some users to access the content 110 while preventing others. As such, the user authentication module 416 is configured to authenticate a user of the destination computing device 106, 114 and determine whether the user is permitted to access the content 110. In doing so, the user authentication module 416 may analyze, for example, biometric data of the user and/or other login information.

The location policy enforcement module 420 is configured to permit or restrict access to the content 110 based on, for example, the current location of the destination computing device 106, 114. As discussed below, it should be appreciated that, although the destination computing device 106, 114 may initially be in a location at which the content use policy permits access to the content 110, the destination computing device 106, 114 may change its location and therefore no longer be in compliance with the content use policy. In those circumstances, the location policy enforcement module 420 is configured to employ a location policy enforcement operation to restrict access to the content 110. For example, the location policy enforcement module 420 may delete the content 110 and the decryption key for the content 110, delete the secure content package, re-encrypt the content 110, and/or perform another suitable security operation to restrict access by the user to the content 110.

As described herein, the secure content use policy enforcement module 414 and, in particular, the location policy enforcement module 420, utilizes various data (e.g., environment data and other sensor data) to determine, for example, whether the destination computing device 106, 114 is at a geographical location and/or within a proximity of some location authorized by the content use policy. As such, the sensor monitoring module 406 collects, analyzes, and/or monitors sensor data generated by the sensors 228 of the destination computing device 106, 114. As described herein, the secure content use policy enforcement module 414 may utilize such data to determine, for example, an audio proximity and/or social network proximity of the destination computing device 106, 114 to the source computing device 102.

It should be appreciated that the secured media path module 404 and the communication module 408 may be similar to the corresponding components of the source computing device 102 described above with regard to the environment 300. That is, the secured media path module 404 facilitates the secure transmission of data through the secure media path circuitry 226, and the communication module 408 handles the communication between the destination computing device 106, 114 and remote devices (e.g., the source computing device 102) through the corresponding network 104, 112.

Figure 5:
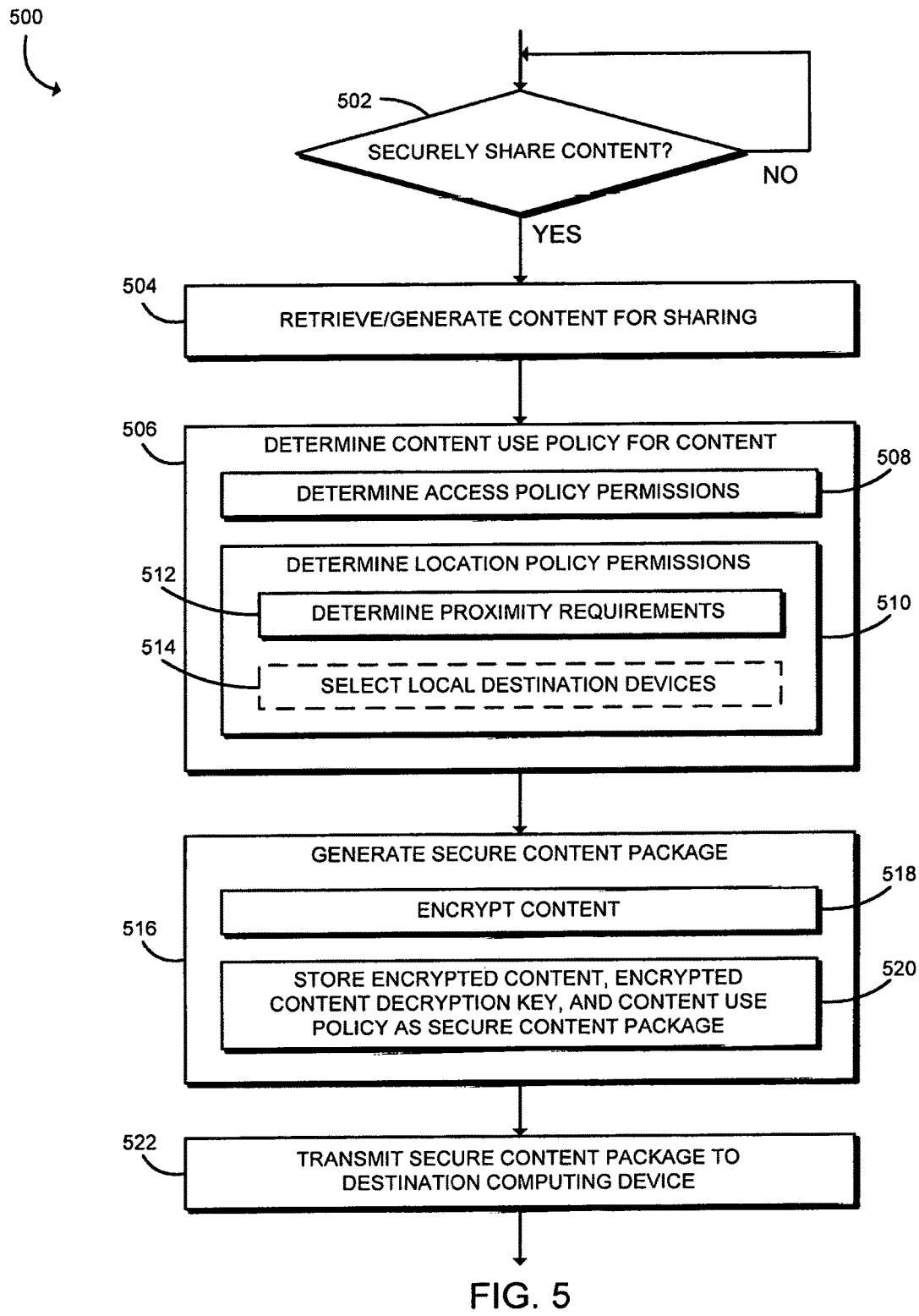
FIG. 5 is a simplified flow diagram of at least one embodiment of a method for securely sharing content by the source computing device of the system of FIG. 1.

Referring now to FIG. 5, in use, the source computing device 102 may execute a method 500 for securely sharing content of the source computing device 102. The illustrative method 500 begins with block 502 in which the source computing device 102 determines whether to securely share content of the source computing device 102. If so, the source computing device 102 retrieves (e.g., from the database 244) or generates (e.g., in real time) content for sharing in block 504. For example, a user of the source computing device 102 may want to share a group picture with the other people shown in the picture.

In block 506, the source computing device 102 determines the content use policy for the retrieved/generated content. That is, the source computing device 102 or the user of the source computing device 102 determines which users and/or destination computing devices 106, 114 are permitted to access the content and the circumstances under which the access is permitted. In doing so, in the illustrative embodiment, the source computing device 102 determines access policy permissions in block 508 and determines location policy permissions in block 510. As discussed above, in establishing access policy permissions, the source computing device 102 determines which destination computing devices 106, 114 are able to read, write, modify, transmit, or otherwise access/utilize the content. It should be appreciated that the source computing device 102 may identify groups or categories of destination computing devices 106, 114 rather than, or in addition to, identifying particular destination computing devices 106, 114 in some embodiments. For example, the source computing device 102 may determine that any destination computing device 106, 114 having a particular hardware, firmware, and/or software component (e.g., the security engine 224) enabling enforcement of the content use policy may access/read the content (i.e., provided the location policy criteria are satisfied). Depending on the particular embodiment, the access policy permissions may be predetermined (e.g., stored in the database 244) or selected by a user of the source computing device 102 in real time.

As discussed above, in determining the location policy permissions, the source computing device 102 establishes locations at which the destination computing devices 106, 114 are permitted to access the content. For example, the source computing device 102 may determine that one or more destination computing devices 106, 114 are permitted to access the content provided that they are located in a particular geographical location (e.g., the same location as the source computing device 102, at an office building, or at some other location) and the access policy is satisfied (e.g., the destination computing devices 106, 114 are permitted to access the content at all).

In the illustrative embodiment, in determining the location policy permissions, the source computing device 102 also determines proximity requirements of the content use policy in block 512. For example, in one embodiment, the source computing device 102 may establish a content use policy that authorizes local destination computing devices 106 within a "conversational distance" or "ear shot" of the source computing device 102 to access the content. It should be appreciated that a measure of physical distance between the source computing device 102 and a particular local destination computing device 106 may be calculated based on technologies such as, for example, GPS, Wi-Fi, and Bluetooth. However, computing devices 102, 106 within a particular physical distance of one another may nonetheless be outside conversational distance due to physical barriers between the computing devices 102, 106. For example, the computing devices 102, 106 may be in separate rooms or on separate floors of the same building. As such, the source computing device 102 may establish other measures of proximity In the content use policy in various embodiments. For example, as discussed below, the source computing device 102 may require that the local destination computing device 106 be within audio proximity or social network proximity of the source computing device 102. Devices within audio proximity or, more specifically, within near audio proximity of one another, for example, may be defined as those able to "hear" the same or similar audio. Additionally, computing devices 102, 106, 114 within social network proximity of one another may be determined to be those computing devices 102, 106, 114 for which the users have "checked in" to a same physical location on a social network application, computing devices 102, 106, 114 that have shared photos with the same people identified in them, computing devices 102, 106, 114 for which the users are social network "friends," and/or otherwise determined.

Figure 6:
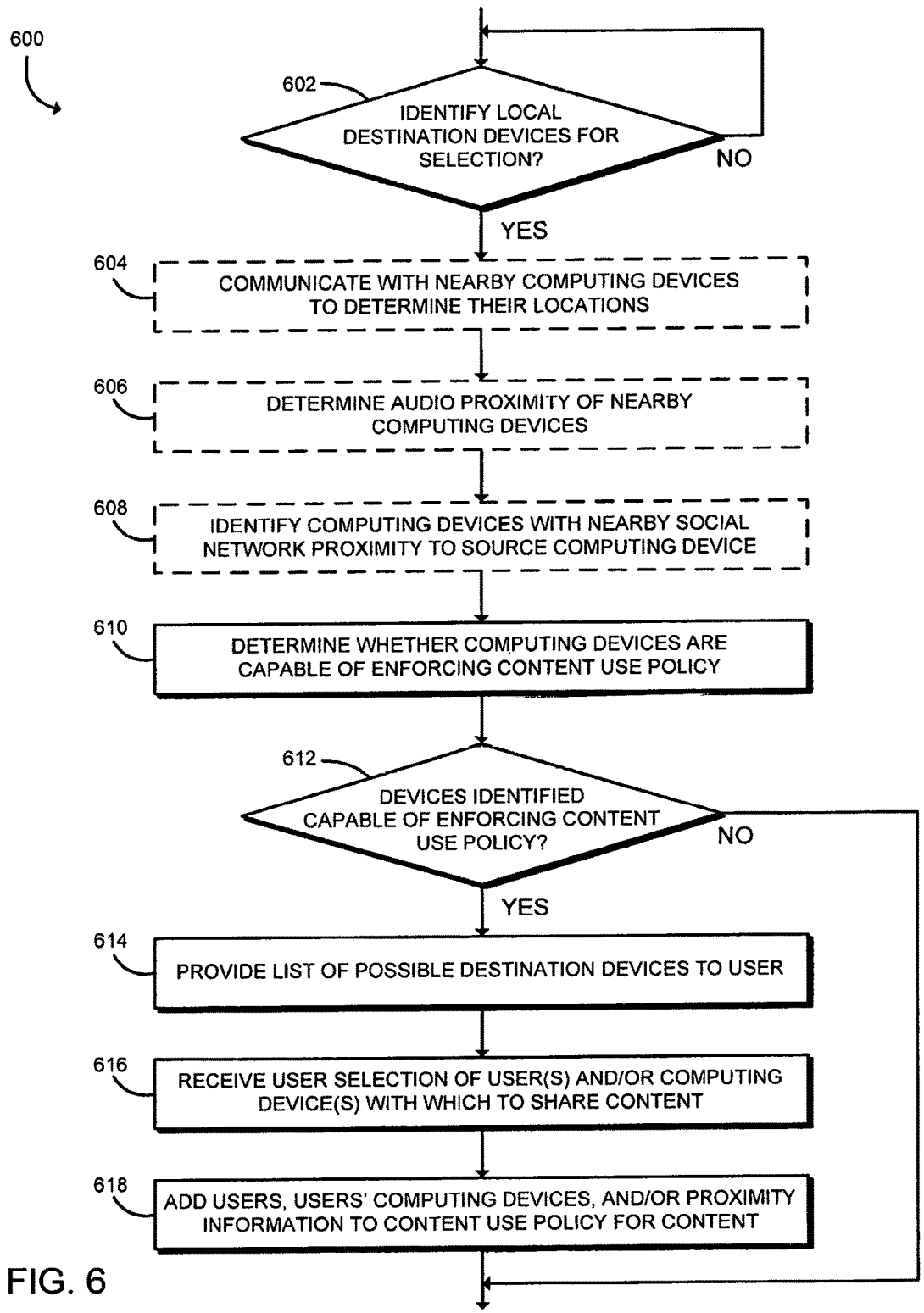
FIG. 6 is a simplified flow diagram of at least one embodiment of a method for selecting location destination devices to add to a content use policy by the source computing device of the system of FIG. 1.

As indicated above, in some embodiments, in determining the location policy permissions, the user of the source computing device 102 may select local destination computing devices 106 for which to permit access to the content. To do so, the source computing device 102 may execute a method 600 as shown in FIG. 6. The illustrative method 600 begins with block 602 in which the source computing device 102 determines whether to identify local destination computing devices 106 for selection. If so, the source computing device 102 may communicate with nearby computing devices (i.e., local destination computing devices 106 within the local environment 108) in block 604 to determine the locations of those computing devices 106 (e.g., absolute or relative to the source computing device 102). For example, in some embodiments, the source computing device 102 transmits a signal (e.g., a ping signal or beacon) to the local destination computing devices 106 requesting geographical location information of the local destination computing devices 106 or some other response. It should be appreciated that, in many circumstances, the source computing device 102 may utilize the geographical location information and/or other response information (e.g., response time) to determine at least an approximate location (e.g., distance from the source computing device 102) of the local destination computing devices 106.

In block 606, the source computing device 102 may determine an audio proximity of the local destination computing devices 106 in some embodiments. As indicated above, local destination computing devices 106 determined to be in very close geographical proximity to the source computing device 102 may nonetheless be "out of ear shot" from the source computing device 102. As such, the source computing device 102 may, for example, analyze audio input of the source computing device 102 and request audio input from the destination computing devices 106 for analysis to determine whether the same sounds are "heard" by the source computing device 102 and the destination computing devices 106. If the source computing device 102 and a destination computing device 106 within a near geographical proximity of the source computing device 102 "hear" the same audio, the devices 102, 106 are likely within "ear shot" of one another. It should be appreciated that, in some embodiments, the destination computing devices 106 may analyze their corresponding audio input and generate audio profiles for transmission to the source computing device 102 and comparison to a corresponding audio profile generated by the source computing device 102.

In block 608, the source computing device 102 may identify those local destination computing devices 106 with a nearby social network proximity to the source computing device 102. For example, as discussed above, the source computing device 102 may determine whether any of the local destination computing devices 106 is "checked in" to a same location on a social network application as the source computing device 102. Of course, the source computing device 102 may use other mechanisms to determine whether the local destination computing devices 106 are within social network proximity to the source computing device 102 in other embodiments.

In block 610, the source computing device 102 determines whether the local destination computing devices 106 are capable of enforcing the content use policy. As discussed above, in some embodiments, the local destination computing devices 106 may require certain hardware, firmware, and/or software (e.g., Intel® Data Use Control components) that enable the local destination computing devices 106 to interpret the secure content package and enforce the content use policy to be generated. In block 612, the source computing device 102 determines whether any of the local destination computing devices 106 have been identified as being able to enforcing the content use policy. It should be appreciated that, if none of the local destination computing devices 106 can enforce the content use policy, none of those devices may be selected for access to the content and, therefore, the method 600 terminates.

However, if the source computing device 102 identifies local destination computing devices 106 that can enforce the content use policy, the source computing device 102 provides a list of possible local destination computing devices 106 to the user for selection in block 614. In some embodiments, the list may include the local destination computing devices 106 and information and/or parameters associated with the particular local destination computing devices 106. For example, the list may identify, for one or more of the local destination computing devices 106 (e.g., for each of them), a physical range of the local destination computing device 106 to the source computing device 102, a likelihood that the local destination computing 106 is within an audio proximity of the source computing device 102, whether the local destination computing device 106 is within a social network proximity of the source computing device 102, and/or other information regarding the local destination computing device 106. In other embodiments, the list may include only those local destination computing device 106 that meet certain criteria (e.g., geographical location, audio proximity, and/or social network proximity criteria). As such, the local destination computing devices 106 included on the list may be a filtered set of the nearby computing devices. Additionally, in some embodiments, the source computing device 102 may present a list of users of the local destination computing devices 106 to the user of the source computing device 102 (e.g., in circumstances in which the local destination computing devices 106 are multi-user systems).

In block 616, the source computing device 102 receives the user's selections of the users and/or local destination computing devices 106 with which to share the content. Of course, in some embodiments, the user may also select proximity requirements that must be maintained in order for the local destination computing devices 106 to continue to access the content. In block 618, the source computing device 102 adds the users, the local destination computing devices 106, and/or proximity information to the content use policy for the content. In embodiments in which the user does not select any local destination computing devices 106, the source computing device 102 may establish the content use policy using other mechanisms (e.g., a default content use policy).

Referring back to FIG. 5, the source computing device 102 generates the content use policy based on the determined access policy permissions and the determined location policy permissions. In block 516, the source computing device 102 generates a secure content package for the content to share. In the illustrative embodiment, in doing so, the source computing device 102 encrypts the content in block 518 and stores the encrypted content, an encrypted version of the content decryption key, and the content use policy as a secure content package in block 520. For example, as discussed above, the source computing device 102 may encrypt the content using any suitable cryptographic algorithm (e.g., using a symmetric or asymmetric encryption cryptographic key), and the corresponding decryption key (i.e., the content decryption key) may be encrypted with a suitable cryptographic key (e.g., by a public key of a one-to-one or one-to-many cryptographic key pair corresponding with a private key of the destination computing devices 106, 114 such as, for example, a hardware key of the secure engine 224) and stored in the secure content package. It should be appreciated that, in other embodiments, the content decryption key may not be included in the secure content package as described above. Further, depending on the particular embodiment, the secure content package itself may be further encrypted with a suitable cryptographic key. In block 522, the source computing device 102 transmits the secure content package to a destination computing device 106, 114 (e.g., a destination computing device 106, 114 requesting the content) or an intermediary device (e.g., a server for a social network application or a cloud storage device).

Figure 7:
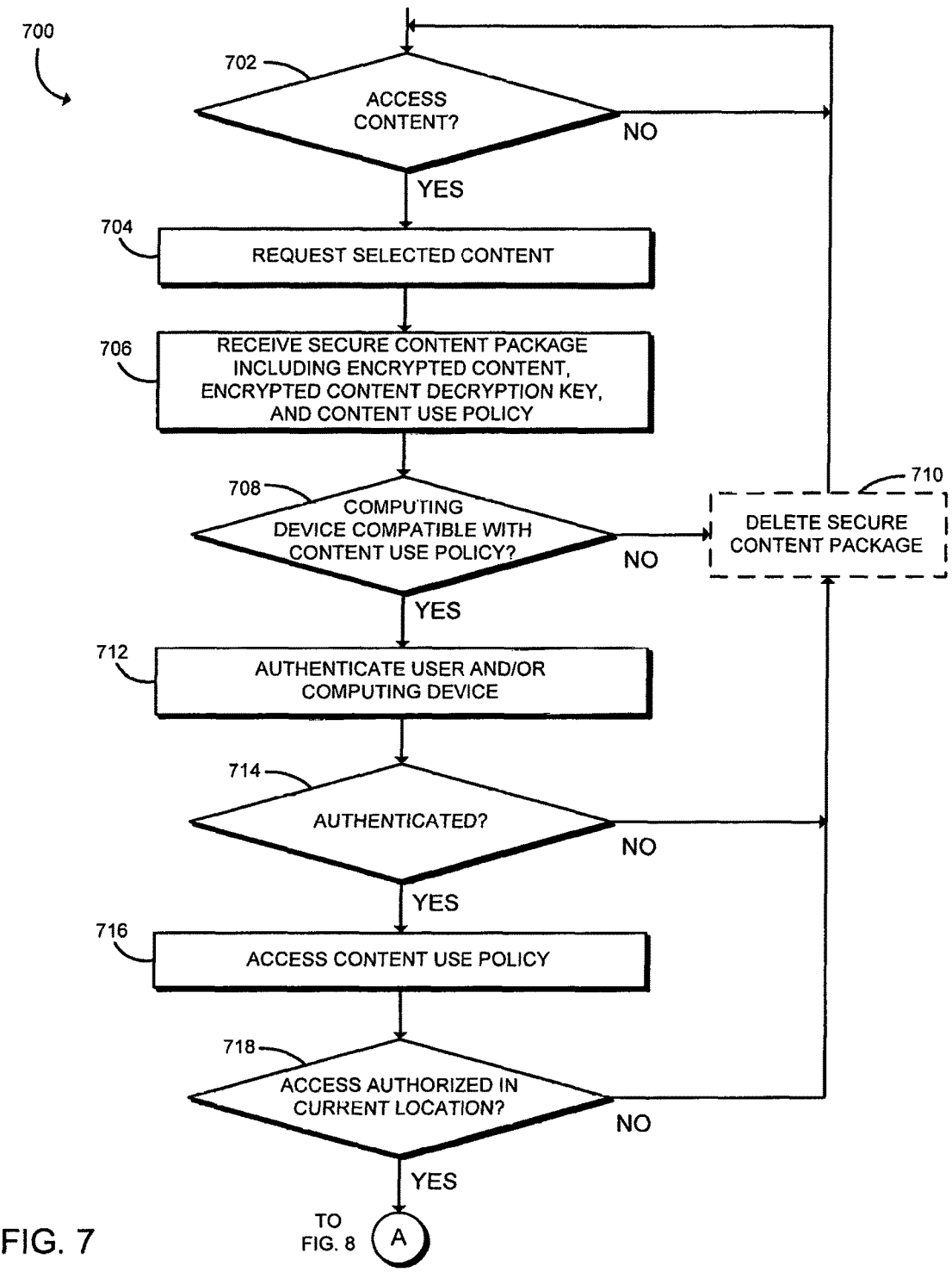
FIGS. 7 and 8 is a simplified flow diagram of at least one embodiment of a method for accessing content by the destination computing device of the system of FIG. 1.

Referring now to FIG. 7, in use, a destination computing device 106, 114 may execute a method 700 for securely accessing content of the source computing device 102. The illustrative method 700 begins with block 702 in which the destination computing device 106, 114 determines whether to access the content. If so, in block 704, the destination computing device 106, 114 requests selected content (e.g., content selected by a user of the destination computing device 106, 114). Depending on the particular embodiment and the storage location of the requested content, the content may be requested from the source computing device 102 or a server (e.g., a storage server for a social network application), or may be received from the source computing device 102 without prompting (in which case the destination computing device 106, 114 may perform a handshake with the source computing device 102 in block 704). In block 706, the destination computing device 106, 114 receives a secure content package from the source computing device 102 (or indirectly via one or more servers). As discussed above with regard to FIGS. 3-5, the secure content package includes the encrypted content and a content use policy for the content and, depending on the particular embodiment, may also include an encrypted version of a content decryption key that may be used to decrypt the encrypted content.

In block 708, the destination computing device 106, 114 determines whether the destination computing device 106, 114 is compatible with the content use policy. That is, as discussed above, the destination computing device 106, 114 determines whether it is able to manage the secure content package (e.g., decrypt the package and/or decryption key in embodiments in which one or more is encrypted) and enforce the content use policy. If not, the destination computing device 106, 114 may delete the secure content package in block 710 and terminate execution of the method 700. However, if the destination computing device 106, 114 determines that it is compatible with the content use policy, the destination computing device 106, 114 authenticates the user and/or the destination in block 712. For example, to authenticate the current user of the destination computing device 106, 114, the destination computing device 106, 114 may capture biometric data of the current user in real time and compare the captured biometric data to a biometric profile stored on the destination computing device 106, 114. In other embodiments, the current user may enter login information or be otherwise authenticated. Additionally, in some embodiments, the destination computing device 106, 114 or components thereof (e.g., the security engine 224) may be authenticated using, for example, attestation algorithms to verify the integrity and/or security of the destination computing device 106, 114. Of course, in other embodiments, the destination computing device 106, 114 may not authenticate one or more of the user or the destination computing device 106, 114 itself.

In block 714, the destination computing device 106, 114 determines whether the user and the destination computing device 106, 114 have been successfully authenticated. If not, the destination computing device 106, 114 may delete the secure content package in block 710 and/or terminate execution of the method 700. However, if the user and the destination computing device 106, 114 have been authenticated, the destination computing device 106, 114 accesses the content use policy from the secure content package in block 716. As discussed above, in some embodiments, the secure content package may be encrypted with a cryptographic encryption key corresponding with a cryptographic decryption key stored on or otherwise accessible by the destination computing device 106, 114. In those circumstances, the destination computing device 106, 114 decrypts the secure content package to access the content use policy associated with the content desired to be accessed.

In block 718, the destination computing device 106, 114 determines whether the destination computing device 106 is authorized to access the content at the current location of the destination computing device 106, 114 based on the content use policy. That is, the destination computing device 106, 114 determines both whether it is permitted to access the content at all and, if so, determines whether it is permitted to access the content while the destination computing device 106, 114 is located at its current location. Specifically, the destination computing device 106, 114 determines its current geographical location and/or proximity (e.g., audio proximity and/or social network proximity) relative to the source computing device 102 or another location depending on the content use policy for the content to be accessed and whether the location policy requirements are met based on such determinations. If not, the destination computing device 106, 114 may delete the secure content package and/or otherwise terminate the method 700.

Figure 8:
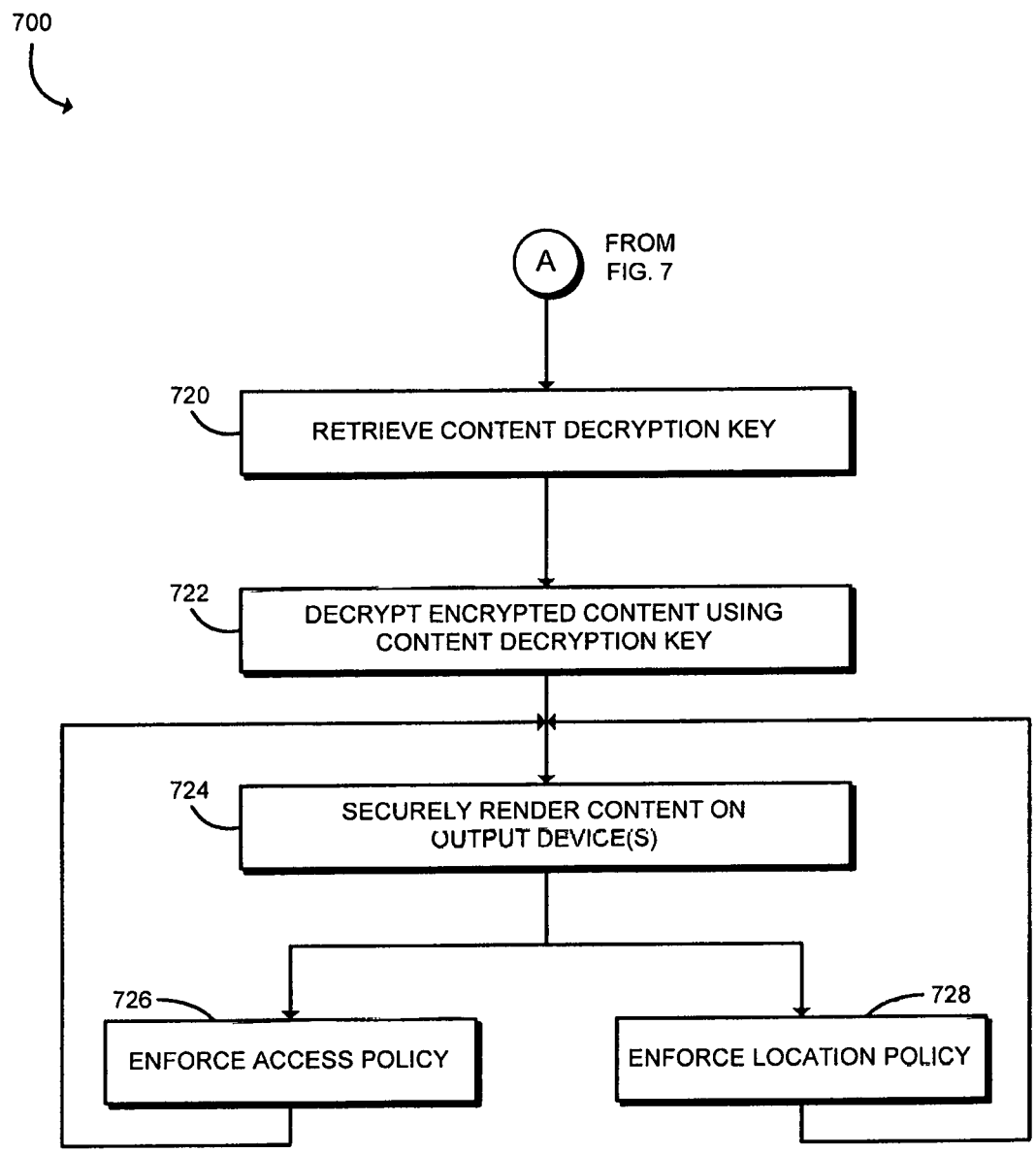

However, if the destination computing device 106, 114 is authorized to access the content, the method 700 advances to block 720 of FIG. 8 in which the destination computing device 106, 114 retrieves the content decryption key. As discussed above, in embodiments in which the content decryption key is itself encrypted (e.g., in the secure content package), the destination computing device 106, 114 may decrypt the content decryption key itself using a suitable decryption key (e.g., a hardware key of the destination computing device 106, 114). However, as discussed above, the destination computing device 106, 114 may, in other embodiments, retrieve the content decryption key from a key management server, or the content decryption key may itself be a cryptographic key of the destination computing device 106, 114 (e.g., a hardware key) or be otherwise accessible to the destination computing device 106, 114. In such embodiments, the destination computing device 106, 114 retrieves the content decryption key from the corresponding device or component.

In block 722, the destination computing device 106, 114 decrypts the encrypted content using the content decryption key to access the desired content. In block 724, the destination computing device 106, 114 securely renders the content on one or more output devices 222 of the destination computing device 106, 114. As discussed above, the destination computing device 106, 114 may utilize the secured media path module 404 and the secure media path circuitry 226 for hardware reinforced security and to facilitate the secure transmission of data to the output devices 222.

As discussed herein, although the destination computing device 106, 114 may initially be permitted to access the content under the content use policy, circumstances may change such that the destination computing device 106, 114 is no longer permitted under the content use policy to have such access. As such, the destination computing device 106, 114 continuously, periodically, or in response to one or more conditions (e.g., a change in location or access attempt) reevaluates compliance with the content use policy, for the content to enforce the policy. In particular, the destination computing device 106, 114 enforces the access policy in block 726 and enforces the location policy in block 728.

Figure 9:
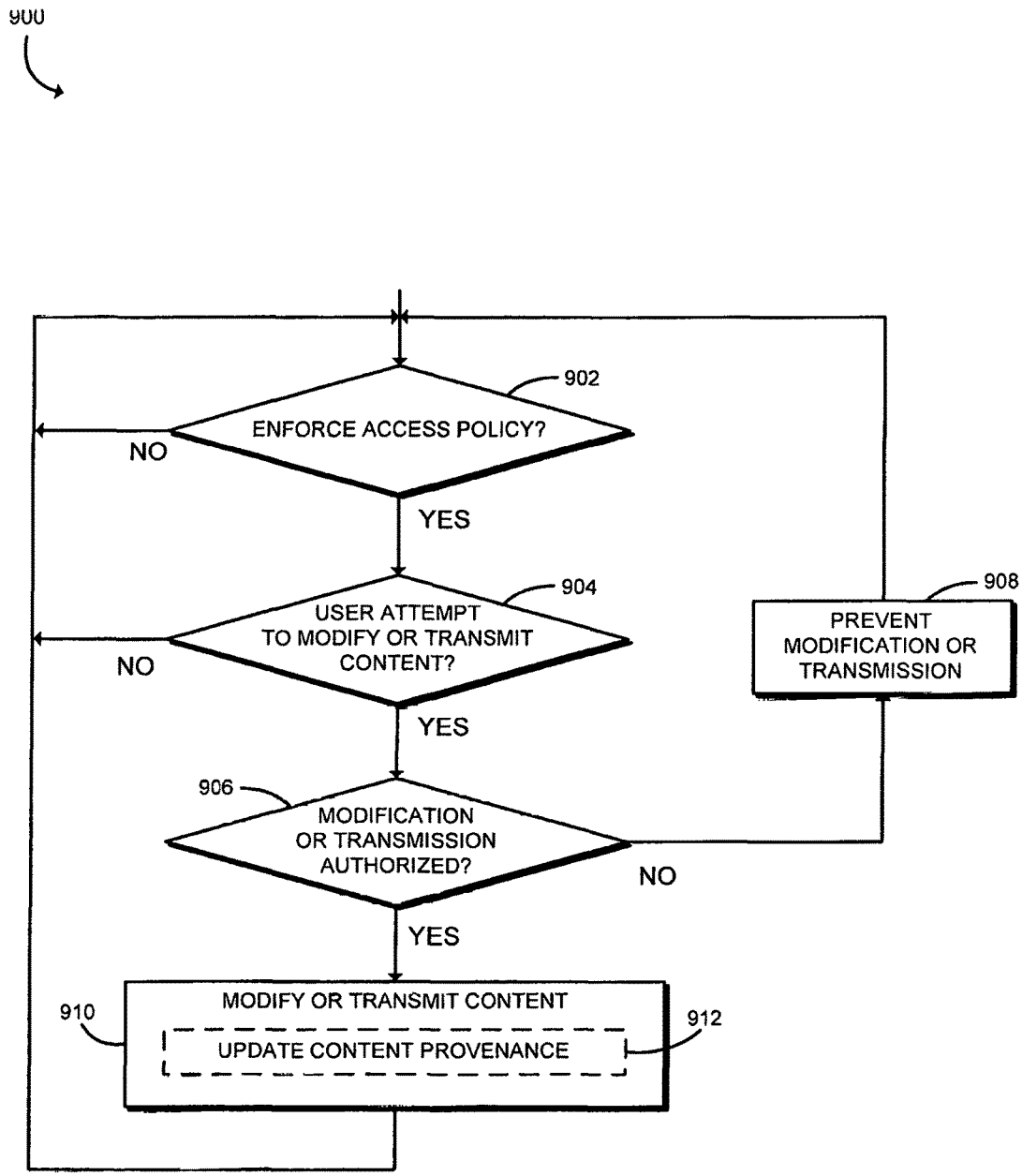
FIG. 9 is a simplified flow diagram of at least one embodiment of a method for enforcing an access policy by the destination computing device of the system of FIG. 1.

In at least one embodiment, the destination computing device 106, 114 may enforce the access policy by executing a method 900 as shown in FIG. 9. The illustrative method 900 begins with block 902 in which the destination computing device 106, 114 determines whether to enforce the access policy. If so, the destination computing device 106, 114 determines whether a user of the destination computing device 106, 114 has attempted to modify or transmit the content in block 904. The destination computing device 106, 114 further determines, in block 906, whether the attempted modification or transmission is authorized by the access policy (i.e., of the content use policy) if the destination computing device 106, 114 determines that the user has, in fact, attempted to modify or transmit the content. If the destination computing device 106, 114 determines in block 906 that the modification or transmission is unauthorized, the destination computing device 106, 114 prevents the modification/transmission in block 908. However, if the attempted modification or transmission is authorized by the access policy, the destination computing device 106, 114 modifies or transmits the content as attempted in block 910. Further, in block 912, the destination computing device 106, 114 may update the provenance of the content based on the modification or transmission. For example, the provenance may be updated with the time, device, and other parameters/characters associated with a particular content modification. Regardless of whether the modification/transmission is prevented in block 908 or performed in block 910, the method 900 returns to block 902 in which the destination computing device 106, 114 determines whether to continue enforcing the access policy.

Figure 10:
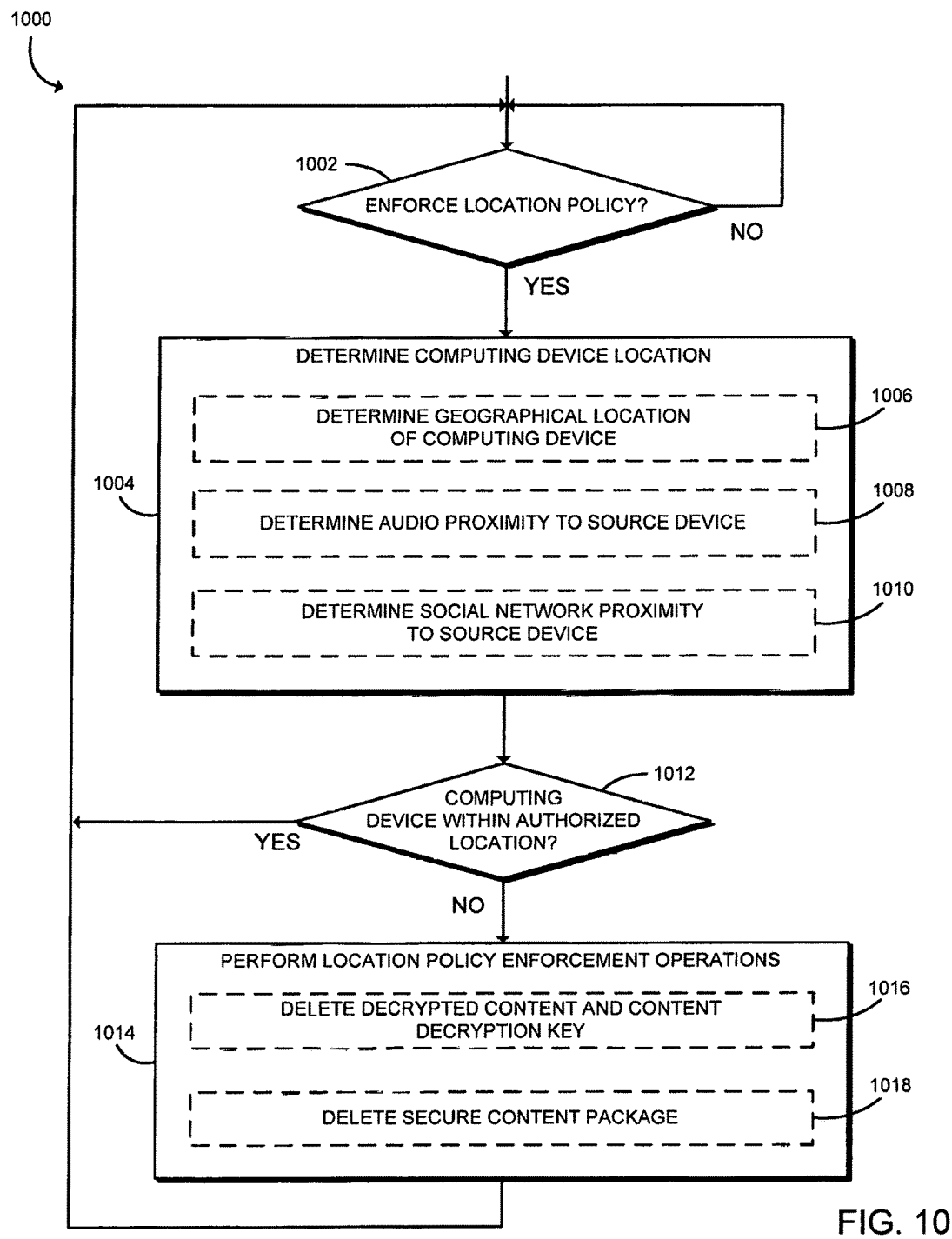
FIG. 10 is a simplified flow diagram of at least one embodiment of a method for enforcing a location policy by the destination computing device of the system of FIG. 1.

The destination computing device 106, 114 may enforce the location policy by executing a method 1000 as shown in FIG. 10. The illustrative method 1000 begins with block 1002 in which the destination computing device 106, 114 determines whether to enforce the location policy. If so, the destination computing device 106, 114 determines its location in block 1004. As discussed in greater detail above, in doing so, the destination computing device 106, 114 may determine its geographical location (e.g., its absolute geographical location or geographical location relative to the source computing device 102 or another reference point) in block 1006. In block 1008, the destination computing device 106, 114 may determine its audio proximity to the source computing device 102. For example, the destination computing device 106, 114 may determine a likelihood that it is within a predefined "conversational distance" or "ear shot" of the source computing device 102. Further, in block 1010, the destination computing device 106, 114 may determine a social network proximity to the source computing device 102. As discussed above, the destination computing device 106, 114 may be within social network proximity to the source computing device 102 if a user of the destination computing device 106, 114 is, for example, "checked in" to a same location (e.g., an identified geographical location) as a user of the source computing device 102.

In block 1012, the destination computing device 106, 114 determines whether it is within an authorized location (i.e., including proximity requirements) based on the location policy (e.g., by comparing the results of the determinations of block 1004 to the location policy). If so, the method 1000 returns to block 1002 in which the destination computing device 106, 114 determines whether to continue enforcing the location policy. However, if the destination computing device 106, 114 is not within an authorized location, the destination computing device 106, 114 performs one or more location policy enforcement operations in block 1014. For example, as discussed above, the destination computing device 106, 114 may delete the decrypted content and the content decryption key in block 1016. In the illustrative embodiment, the destination computing device 106, 114 is thereafter unable to access the decrypted content unless circumstances change such that the destination computing device 106, 114 is again permitted access (e.g., the destination computing device 106, 114 returns to an authorized location). In some embodiments, to determine whether the destination computing device 106, 114 is subsequently granted access to the content, the destination computing device 106, 114 may re-execute the method 700 or a portion thereof. It should be appreciated that, by doing so, the source computing device 102 is able to exert control over the content even after transmitting the content to the destination computing device 106, 114 by virtue of the content use policy associated with the content. Additionally, in some embodiments, the destination computing device 106, 114 also deletes the secure content package in block 1018. Of course, in other embodiments, the destination computing device 106, 114 may perform other location policy enforcement operations as discussed above.

EXAMPLES

Illustrative examples of the technologies disclosed herein are provided below. An embodiment of the technologies may include any one or more, and any combination of, the examples described below.

Example 1 includes a source computing device for distributing secure content, the source computing device comprising a secure content use policy generation module to determine a content use policy for content of the source computing device, wherein the content use policy defines at least one location at which a destination computing device is permitted to access the content; a secure content generation module to (i) encrypt the content with an encryption key to generate encrypted content and (ii) generate a secure content package that includes the encrypted content and the content use policy; and a communication module to transmit the secure content package to the destination computing device.

Example 2 includes the subject matter of Example 1, and wherein the content use policy defines a proximity from the at least one location within which the destination computing device is permitted to access the content.

Example 3 includes the subject matter of any of Examples 1 and 2, and wherein the content use policy defines a measure of audio proximity from the at least one location within which the destination computing device is permitted to access the content.

Example 4 includes the subject matter of any of Examples 1-3, and wherein the content use policy defines a measure of social network proximity to the source computing device within which the destination computing device is permitted to access the content.

Example 5 includes the subject matter of any of Examples 1-4, and wherein the content use policy defines access policy permissions for the content that identify authorized uses of the content by the destination computing device.

Example 6 includes the subject matter of any of Examples 1-5, and wherein the secure content package comprises a Data Use Control object.

Example 7 includes the subject matter of any of Examples 1-6, and wherein the secure content generation module is to encrypt the secure content package with an asymmetric cryptographic encryption key corresponding with a decryption key of the destination computing device.

Example 8 includes the subject matter of any of Examples 1-7, and further including a device proximity determination module to communicate with nearby computing devices to determine corresponding locations of the nearby computing devices, wherein to determine the content use policy comprises to identify at least one of the nearby computing devices for a user of the source computing device in response to a determination that the at least one of the nearby computing devices is capable of enforcing the content use policy; receive a selection from a user of the source computing device of the identified nearby computing device capable of enforcing the content use policy for which to permit access to the content; and modify the content use policy based on the user's selection.

Example 9 includes the subject matter of any of Examples 1-8, and wherein the device proximity determination module is to determine an audio proximity of the at least one of the nearby computing devices to the source computing device.

Example 10 includes the subject matter of any of Examples 1-9, and wherein the device proximity determination module is to determine a social networking proximity of the at least one of the nearby computing devices to the source computing device, wherein two devices identified as being at a same geographical location on a social networking application are considered to be within social network proximity of one another.

Example 11 includes the subject matter of any of Examples 1-10, and wherein the generated secure content package further includes an encrypted version of a decryption key corresponding with the encryption key.

Example 12 includes the subject matter of any of Examples 1-11, and wherein the secure content generate module is to encrypt the decryption key with an asymmetric cryptographic encryption key corresponding with a decryption key of the destination computing device to generate the encrypted version of the decryption key.

Example 13 includes the subject matter of any of Examples 1-12, and wherein the secure content generation module is to encrypt the content with an encryption key received from a key management server.

Example 14 includes a destination computing device for accessing content of a source computing device, the destination computing device comprising a communication module to receive a secure content package including encrypted content and a content use policy associated with the content, wherein the content use policy defines at least one location at which the destination computing device is permitted to access the content; a sensor monitoring module to determine a location of the destination computing device; and a secure content use policy enforcement module to (i) determine whether the destination computing device is permitted to access the content at the determined location based on the content use policy, (ii) decrypt the encrypted content with a decryption key to generate the content in response to a determination that the destination computing device is permitted to access the content, and (iii) enforce the content use policy based on a current location of the destination computing device.

Example 15 includes the subject matter of Example 14, and wherein to receive the secure content package comprises to receive the secure content package in response to a request, by the destination computing device, to access the content.

Example 16 includes the subject matter of any of Examples 14 and 15, and wherein the secure content package comprises a Data Use Control object.

Example 17 includes the subject matter of any of Examples 14-16, and wherein to determine whether the destination computing device is permitted to access the content comprises to access the content use policy from the secure content package.

Example 18 includes the subject matter of any of Examples 14-17, and further including a secure content policy identification module to (i) decrypt the secure content package with a decryption key of the destination computing device and (ii) access the content use policy from the secure content package in response to decryption of the secure content package, wherein to decrypt the encrypted content is further in response to decryption of the secure content package.

Example 19 includes the subject matter of any of Examples 14-18, and further including a user authentication module to (i) authenticate a user of the destination computing device and (ii) determine whether the user is permitted to access the content, wherein to determine whether the destination computing device is permitted to access the content further comprises to determine whether the user is permitted to access the content.

Example 20 includes the subject matter of any of Examples 14-19, and wherein to determine whether the destination computing device is permitted to access the content comprises to determine whether the destination computing device is compatible with the secure content package and capable of enforcing the content use policy.

Example 21 includes the subject matter of any of Examples 14-20, and further including an output device to securely render the content.

Example 22 includes the subject matter of any of Examples 14-21, and wherein to enforce the content use policy comprises to prevent an unauthorized use of the content by the destination computing device based on the content use policy.

Example 23 includes the subject matter of any of Examples 14-22, and wherein to prevent the unauthorized use comprises to prevent at least one of an unauthorized modification of the content or an unauthorized transmission of the content to another computing device.

Example 24 includes the subject matter of any of Examples 14-23, and wherein to determine the location of the destination computing device comprises to determine at least one of an audio proximity or a social network proximity of the destination computing device to the source computing device.

Example 25 includes the subject matter of any of Examples 14-24, and wherein to enforce the content use policy comprises to determine the current location of the destination computing device; and perform a location policy enforcement operation in response to a determination that the content use policy does not permit the destination computing device to access the content at the current location.

Example 26 includes the subject matter of any of Examples 14-25, and wherein to determine the current location of the destination computing device comprises to determine a geographical location of the destination computing device and at least one of an audio proximity or a social network proximity of the destination computing device to the source computing device.

Example 27 includes the subject matter of any of Examples 14-26, and wherein to perform the location policy enforcement operation comprises to delete the content and the decryption key from a memory of the destination computing device.

Example 28 includes the subject matter of any of Examples 14-27, and wherein the received secure content package further includes an encrypted version of the decryption key; and the secure content use policy enforcement module is to decrypt the encrypted content with the decryption key in response to decryption of the encrypted version of the decryption key.

Example 29 includes the subject matter of any of Examples 14-28, and wherein to decrypt the encrypted version of the decryption key comprises to decrypt the encryption version with a corresponding decryption key of the destination computing device.

Example 30 includes the subject matter of any of Examples 14-29, and wherein to decrypt the encrypted content comprises to decrypt the encrypted content with the decryption key in response to receipt of the decryption key from a key management server.

Example 31 includes a method for distributing secure content by a source computing device, the method comprising determining, by the source computing device, a content use policy for content of the source computing device, wherein the content use policy defines at least one location at which a destination computing device is permitted to access the content; encrypting, by the source computing device, the content with an encryption key to generate encrypted content; generating, by the source computing device, a secure content package including the encrypted content and the content use policy; and transmitting, by the source computing device, the secure content package to the destination computing device.

Example 32 includes the subject matter of Example 31, and wherein determining the content use policy comprises determining a content use policy that defines a proximity from the at least one location within which the destination computing device is permitted to access the content.

Example 33 includes the subject matter of any of Examples 31 and 32, and wherein determining the content use policy comprises determining a content use policy that defines a measure of audio proximity from the at least one location within which the destination computing device is permitted to access the content.

Example 34 includes the subject matter of any of Examples 31-33, and wherein determining the content use policy comprises determining a content use policy that defines a measure of social network proximity to the source computing device within which the destination computing device is permitted to access the content.

Example 35 includes the subject matter of any of Examples 31-34, and wherein determining the content use policy comprises determining access policy permissions for the content, wherein the access policy permissions define authorized uses of the content by the destination computing device.

Example 36 includes the subject matter of any of Examples 31-35, and wherein generating the secure content package comprises generating a Data Use Control object.

Example 37 includes the subject matter of any of Examples 31-36, and wherein generating the secure content package comprises encrypting the secure content package with an asymmetric cryptographic encryption key corresponding with a decryption key of the destination computing device.

Example 38 includes the subject matter of any of Examples 31-37, and wherein determining the content use policy comprises communicating with nearby computing devices to determine corresponding locations of the nearby computing devices; identifying at least one of the nearby computing devices for a user of the source computing device in response to determining the at least one of the nearby computing devices is capable of enforcing the content use policy; receiving a selection from a user of the source computing device of the identified nearby computing device capable of enforcing the content use policy for which to permit access to the content; and modifying the content use policy based on the user's selection.

Example 39 includes the subject matter of any of Examples 31-38, and wherein determining the content use policy further comprises determining an audio proximity of the at least one of the nearby computing devices to the source computing device.

Example 40 includes the subject matter of any of Examples 31-39, and wherein determining the content use policy further comprises determining a social networking proximity of the at least one of the nearby computing devices to the source computing device, wherein two devices identified as being at a same geographical location on a social networking application are considered to be within social network proximity of one another.

Example 41 includes the subject matter of any of Examples 31-40, and wherein the generated secure content package further includes an encrypted version of a decryption key corresponding with the encryption key.

Example 42 includes the subject matter of any of Examples 31-41, and further including encrypting, by the source computing device, the decryption key with an asymmetric cryptographic encryption key corresponding with a decryption key of the destination computing device to generate the encrypted version of the decryption key.

Example 43 includes the subject matter of any of Examples 31-42, and wherein encrypting the content comprises encrypting the content with an encryption key received from a key management server.

Example 44 includes a computing device comprising a processor; and a memory having stored therein a plurality of instructions that when executed by the processor cause the computing device to perform the method of any of Examples 31-43.

Example 45 includes one or more machine-readable storage media comprising a plurality of instructions stored thereon that, in response to being executed, result in a computing device performing the method of any of Examples 31-43.

Example 46 includes a computing device for distributing secure content, the computing device comprising means for performing the method of any of Examples 31-43.

Example 47 includes a method for accessing content by a destination computing device, the method comprising receiving, by the destination computing device, a secure content package including encrypted content and a content use policy associated with the content, wherein the content use policy defines at least one location at which the destination computing device is permitted to access the content; determining, by the destination computing device, a location of the destination computing device; determining, by the destination computing device and based on the content use policy, whether the destination computing device is permitted to access the content at the determined location; decrypting, by the destination computing device, the encrypted content with a decryption key to generate the content in response to determining that the destination computing device is permitted to access the content; and enforcing, by the destination computing device, the content use policy based on a current location of the destination computing device.

Example 48 includes the subject matter of Example 47, and wherein receiving the secure content package comprises receiving the secure content package in response to requesting, by the destination computing device, access to the content.

Example 49 includes the subject matter of any of Examples 47 and 48, and wherein receiving the secure content package comprises receiving a Data Use Control object.

Example 50 includes the subject matter of any of Examples 47-49, and wherein determining whether the destination computing device is permitted to access the content comprises accessing the content use policy from the secure content package.

Example 51 includes the subject matter of any of Examples 47-50, and further including decrypting, by the destination computing device, the secure content package with a decryption key of the destination computing device; and accessing the content use policy from the secure content package in response to decrypting the secure content package, wherein decrypting the encrypted content is further in response to decrypting the secure content package.

Example 52 includes the subject matter of any of Examples 47-51, and wherein determining whether the destination computing device is permitted to access the content comprises authenticating a user of the destination computing device; and determining whether the user is permitted to access the content.

Example 53 includes the subject matter of any of Examples 47-52, and wherein determining whether the destination computing device is permitted to access the content comprises determining whether the destination computing device is compatible with the secure content package and capable of enforcing the content use policy.

Example 54 includes the subject matter of any of Examples 47-53, and further including rendering, securely by the destination computing device, the content on an output device of the destination computing device.

Example 55 includes the subject matter of any of Examples 47-54, and wherein enforcing the content use policy comprises preventing an unauthorized use of the content by the destination computing device based on the content use policy.

Example 56 includes the subject matter of any of Examples 47-55, and wherein preventing the unauthorized use comprises preventing at least one of an unauthorized modification of the content or an unauthorized transmission of the content to another computing device.

Example 57 includes the subject matter of any of Examples 47-56, and, wherein determining the location of the destination computing device comprises determining at least one of an audio proximity or a social network proximity of the destination computing device to a source computing device.

Example 58 includes the subject matter of any of Examples 47-57, and wherein enforcing the content use policy comprises determining the current location of the destination computing device; and performing a location policy enforcement operation in response to determining that the content use policy does not permit the destination computing device to access the content at the current location.

Example 59 includes the subject matter of any of Examples 47-58, and wherein determining the current location of the destination computing device comprises determining a geographical location of the destination computing device and at least one of an audio proximity or a social network proximity of the destination computing device to a source computing device.

Example 60 includes the subject matter of any of Examples 47-59, and wherein performing the location policy enforcement operation comprises deleting the content and the decryption key from a memory of the destination computing device.

Example 61 includes the subject matter of any of Examples 47-60, and wherein the received secure content package further includes an encrypted version of the decryption key; and decrypting the encrypted content comprises decrypting the encrypted content with the decryption key in response to decrypting the encrypted version of the decryption key.

Example 62 includes the subject matter of any of Examples 47-61, and wherein decrypting the encrypted version of the decryption key comprises decrypting the encryption version with a corresponding decryption key of the destination computing device.

Example 63 includes the subject matter of any of Examples 47-62, and wherein decrypting the encrypted content comprises decrypting the encrypted content with the decryption key in response to receiving the decryption key from a key management server.

Example 64 includes a computing device comprising a processor; and a memory having stored therein a plurality of instructions that when executed by the processor cause the computing device to perform the method of any of Examples 47-63.

Example 65 includes one or more machine-readable storage media comprising a plurality of instructions stored thereon that, in response to being executed, result in a computing device performing the method of any of Examples 47-63.

Example 66 includes computing device for accessing content, the computing device comprising means for performing the method of any of Examples 47-63.

What is claimed is:

1. A source computing device for distributing secure content, the source computing device comprising:
 a processor; and
 a memory having a plurality of instructions stored thereon that, when executed by the processor, causes the source computing device to:
  communicate with nearby computing devices to determine corresponding locations of the nearby computing devices;
  determine, prior to a receipt of a request for content from a destination device, a content use policy for content of the source computing device by (i) identification of at least one of the nearby computing devices for a user of the source computing device in response to a determination that the at least one of the nearby computing devices is capable of enforcing the content use policy, (ii) determination of at least one of an audio proximity or a social network proximity of the at least one of the nearby computing devices to the source computing device, (iii) receipt of a selection by the user of one or more nearby computing devices of the at least one of the nearby computing devices identified as capable of enforcing the content use policy for which to permit access to the content, and (iii) a modification of the content use policy based on the user's selection, wherein the selected one or more nearby computing devices includes the destination device;
  encrypt the content with an encryption key to generate encrypted content;
  generate a secure content package that includes the encrypted content and the content use policy; and
  transmit the secure content package to the destination computing device;
  wherein the content use policy includes (i) location restrictions that define a geographic location defined by the source computing device at which the destination computing device is permitted to access the content and (ii) proximity requirements that define a physical distance proximity from the geographic location within which the destination computing device is permitted to access the content, and
  wherein two devices identified as being at a same geographical location on a social networking application are considered to be within social network proximity of one another.

2. The source computing device of claim 1, wherein the proximity requirements define a measure of audio proximity from the geographic location within which the destination computing device is permitted to access the content.

3. The source computing device of claim 1, wherein the proximity requirements define a measure of social network proximity to the source computing device within which the destination computing device is permitted to access the content.

4. The source computing device of claim 1, wherein the content use policy defines access policy permissions for the content that identify authorized uses of the content by the destination computing device.

5. The source computing device of claim 1, wherein the secure content package comprises a data use control object.

6. A destination computing device for accessing content of a source computing device, the destination computing device comprising:
 a processor; and
 a memory having a plurality of instructions stored thereon that, when executed by the processor, causes the destination computing device to:
  transmit a content request for the content to the source computing device;
  receive, in response to a transmittal of the content request, a secure content package including encrypted content and a content use policy associated with the content, wherein the content use policy is generated and modified by a user of the source computing device prior to the transmittal of the content request based on a current location of the destination computing device and whether the destination computing device is capable of enforcing the content use policy and includes (i) location restrictions that define a geographic location defined by the source computing device at which the destination computing device is permitted to access the content and (ii) proximity requirements that define a physical distance proximity from the geographic location within which the destination computing device is permitted to access the content;
  determine a location of the destination computing device;
  determine whether the destination computing device is permitted to access the content at the determined location based on the content use policy;
  decrypt the encrypted content with a decryption key to generate the content in response to a determination that the destination computing device is permitted to access the content; and
  enforce the content use policy based on a current location of the destination computing device;
  wherein the current location of the destination computing device is determined by a determination of at least one of an audio proximity or a social network proximity of the destination computing device to the source computing device.

7. The destination computing device of claim 6, wherein the secure content package comprises a data use control object.

8. The destination computing device of claim 6, wherein to determine whether the destination computing device is permitted to access the content comprises to (i) decrypt the secure content package with a decryption key of the destination computing device and (ii) access the content use policy from the secure content package in response to decryption of the secure content package,
 wherein to decrypt the encrypted content is further in response to decryption of the secure content package.

9. The destination computing device of claim 6, wherein the plurality of instructions, when executed, further cause the destination computing device to (i) authenticate a user of the destination computing device and (ii) determine whether the user is permitted to access the content, wherein to determine whether the destination computing device is permitted to access the content further comprises to determine whether the user is permitted to access the content.

10. The destination computing device of claim 6, wherein to determine whether the destination computing device is permitted to access the content comprises to determine whether the destination computing device is compatible with the secure content package and capable of enforcing the content use policy.

11. The destination computing device of claim 6, wherein to enforce the content use policy comprises to prevent an unauthorized use of the content by the destination computing device based on the content use policy.

12. The destination computing device of claim 6, wherein to determine the location of the destination computing device comprises to determine at least one of an audio proximity or a social network proximity of the destination computing device to the source computing device.

13. The destination computing device of claim 6, wherein to enforce the content use policy comprises to:
    determine the current location of the destination computing device; and
    perform a location policy enforcement operation in response to a determination that the content use policy does not permit the destination computing device to access the content at the current location.

14. The destination computing device of claim 13, wherein to determine the current location of the destination computing device comprises to determine a geographical location of the destination computing device and at least one of an audio proximity or a social network proximity of the destination computing device to the source computing device.

15. The destination computing device of claim 13, wherein to perform the location policy enforcement operation comprises to delete the content and the decryption key from a memory of the destination computing device.

16. One or more non-transitory, machine-readable storage media comprising a plurality of instructions stored thereon that, in response to execution by a computing device, cause the computing device to:
    transmit a content request for the content to a source computing device;
    receive a secure content package from the source computing device including encrypted content and a content use policy associated with the content, wherein the content use policy is generated and modified by a user of the source computing device prior to the transmittal of the content request based on a current location of the computing device and whether the computing device is capable of enforcing the content use policy and includes (i) location restrictions that define a geographic location at which the computing device is permitted to access the content and (ii) proximity requirements that define a physical distance proximity from the geographic location within which the computing device is permitted to access the content;
    determine, in response to a receipt of the secure content package, a location of the computing device;
    determine, based on the content use policy, whether the computing device is permitted to access the content at the determined location;
    decrypt the encrypted content with a decryption key to generate the content in response to a determination that the computing device is permitted to access the content; and
    enforce the content use policy based on a current location of the computing device;
    wherein the current location of the computing device is determined by a determination of at least one of an audio proximity or a social network proximity of the computing device to the source computing device.

17. The one or more non-transitory, machine-readable storage media of claim 16, wherein to receive the secure content package comprises to receive a data use control object.

18. The one or more non-transitory, machine-readable storage media of claim 16, wherein to enforce the content use policy comprises to:
    determine the current location of the computing device; and
    perform a location policy enforcement operation in response to a determination that the content use policy does not permit the computing device to access the content at the current location.

19. The one or more non-transitory, machine-readable storage media of claim 18, wherein to determine the current location of the computing device comprises to determine a geographical location of the computing device and at least one of an audio proximity or a social network proximity of the computing device to the source computing device.

20. The one or more non-transitory, machine-readable storage media of claim 18, wherein to perform the location policy enforcement operation comprises to delete the content and the decryption key from a memory of the computing device.

21. The one or more non-transitory, machine-readable storage media of claim 16, wherein to enforce the content use policy comprises to prevent an unauthorized use of the content by the computing device based on the content use policy.

* * * * *